United States Patent [19]
Singh et al.

[11] Patent Number: 6,038,660
[45] Date of Patent: Mar. 14, 2000

[54] METHOD AND APPARATUS FOR UPDATING A PROGRAM COUNTER

[75] Inventors: Balraj Singh, Morgan Hill; Danielle G. Lemay, Sunnyvale; Venkat Mattela, San Jose; Heonchul Park, Pleasanton; Andreas Grubert, Redwood City, all of Calif.

[73] Assignee: Infineon Technologies North America Corp., San Jose, Calif.

[21] Appl. No.: 09/318,885

[22] Filed: May 26, 1999

[51] Int. Cl.$^7$ .................................................. G06F 9/32
[52] U.S. Cl. ........................................................ 712/230
[58] Field of Search .................... 712/205, 230, 712/245

[56] References Cited

U.S. PATENT DOCUMENTS

| | | | |
|---|---|---|---|
| 5,218,711 | 6/1993 | Yoshida | 395/800 |
| 5,410,660 | 4/1995 | Divine et al. | 395/375 |
| 5,410,721 | 4/1995 | Divine et al. | 395/800 |
| 5,459,847 | 10/1995 | Okamura | 395/421.03 |
| 5,559,975 | 9/1996 | Christie et al. | 395/375 |
| 5,799,162 | 8/1998 | Christie et al. | 712/205 |

*Primary Examiner*—David Y. Eng

[57] ABSTRACT

A method and apparatus for providing a program counter value within a central processing unit is described. A program counter value comprises n bits and has to be increased by one of a plurality of different fixed increment values. Therefore, an upper partial content of the current program counter value and its value incremented by 1 is provided. Also, a plurality of lower partial contents of the current program counter value incremented by one of the plurality of fixed increment values, respectively are provided, whereby a carry bit is provided. One of the plurality of incremented lower partial contents is selected depending on said respective carry bit. Upper and lower contents are then combined to form a plurality of new program counter values. Upon receiving of control information to select a final increment value one of said new program counter values will be selected.

19 Claims, 7 Drawing Sheets

| Mode \ MUX | F (201) | G (204) | H (206) | I (208) |
|---|---|---|---|---|
| +2 | 1 | 2 | 1 | 2 |
| +4 | 2 | 1 | 2 | 2 |
| +6 | 1 | 2 | 2 | 2 |
| +8 | 2 | 1 | 1 | 1 |

FIG. 8

METHOD AND APPARATUS FOR UPDATING A PROGRAM COUNTER

BACKGROUND OF THE INVENTION

The present invention relates to a method and apparatus for providing a program counter value within a central processing unit of a microprocessor or microcontroller. The program counter contains the address in a memory of an instruction to be executed by a central processing unit. Within modern microprocessors, such as a superscalar microprocessor, exists the possibility of executing multiple instructions in parallel. Furthermore, the size of each instruction may vary. The program counter which indicates the memory location of a currently executed instruction has to be updated after execution of one or more instructions executed in parallel. Thus, the next program counter value depends on the current program counter value and the number of bytes constituting the issued instructions. For example, the number of bytes issued can vary from two to eight within a microprocessor who is capable of issuing a minimum of one 16-bit instruction (2 bytes) and a maximum of two 32-bit instructions (8 bytes), as each instruction can be two or four bytes long and up to two instructions could be issued in any one cycle.

In a pipelined microprocessor, the number of actual instructions which can be issued and the size of these instructions will be known at a relatively late time. Thus, very little time is left to calculate the next program counter value. The value is required to be calculated without serializing the addition based on the number of bytes issued to save as much time as possible.

SUMMARY OF THE INVENTION

It is therefore an object of the present invention to provide a method and apparatus for providing a program counter value within a central processing unit as quickly as possible. This object is achieved by a method for providing a program counter value within a central processing unit, whereby the program counter value comprises n bits and has to be increased by one of a plurality of different fixed increment values. The method comprises the steps of:

providing an upper partial content of the current program counter value and its value incremented by 1;

providing a plurality of a lower partial contents of the current program counter value incremented by one of the plurality of fixed increment values, respectively, whereby a carry bit is provided;

selecting for each of the plurality of incremented lower partial contents depending on the respective carry bit either the upper partial content of the current program counter value or the incremented upper partial content of the current program counter value;

combining the selected upper and lower contents to form a plurality of new program counter values;

selecting upon receiving of a final increment value one of the new program counter values.

Another method according to the present invention comprising the steps of:

providing an upper partial content of the current program counter value and its value incremented by 1;

providing a lower partial content of the current program counter value incremented by a selected one of the plurality of fixed increment values, whereby a carry bit is provided;

depending on the respective carry bit selecting either the upper partial content of the current program counter value or the incremented upper partial content of the current program counter value;

combining the selected upper and lower contents to form a new program counter value.

A first embodiment according to the present invention comprises a data processing device having a program counter, whereby the program counter comprises n bits and has to be increased by one of a plurality of different fixed increment values; comprising:

an incrementer for incrementing an upper partial content of the program counter value by 1, coupled with the upper partial of the program counter;

a plurality of logic circuits, whereby each logic circuits is coupled with one or more bits of a lower partial content of the program counter to provide the value of the lower partial content incremented by one of the fixed increment values and a control signal;

a plurality of multiplexers coupled with the upper partial content of the program counter and with the incremented upper partial content, respectively, whereby the multiplexers are controlled by the control signal, and each output of the multiplexers is combined with the output of the logic circuits, respectively to form a respective incremented program counter value;

a multiplexer coupled with the combined outputs to select one of the incremented program counter values.

A second embodiment according to the present invention comprises a data processing device having a program counter, whereby the program counter comprises n bits and has to be increased by at least two different fixed increment values; comprising:

an incrementer coupled with the upper partial content of the program counter for incrementing the upper partial content of the program counter value by 1;

a single inverter coupled with a first bit of the selected lower partial content of the program counter, a first multiplexer with inputs coupled with first bit and with the output of the inverter, respectively, the output of the first multiplexer providing a first bit of the incremented program counter value;

a full-adder with three inputs and two outputs, the first input being coupled with the output of a second multiplexer whose inputs are coupled with the first bit of the selected lower partial content and with a logical "0", respectively, the second input being coupled with a second bit of the selected lower partial content, the third input being coupled through a third multiplexer with either a logical "0" or a logical "1", the first output of the full-adder providing a second bit of the incremented program counter value;

a half-adder with two inputs and two outputs, the first input being coupled with the second output of the full-adder and the second input being coupled with a third bit of the selected lower partial content, the first output of the half-adder providing a third bit of the incremented program counter value; and the control signal is formed by the most significant bit of the selected lower partial content of the incremented program counter value;

a multiplexer being controlled by the second output of the half-adder and whose inputs are coupled with the upper content of the program counter and with the output of the incrementer, the output of the incrementer providing the upper content of the incremented program counter value.

BRIEF DESCRIPTION OF THE DRAWINGS

FIG. 8 is a table of the different signals provided to the multiplexers of FIG. 7.

DESCRIPTION OF THE PREFERRED EMBODIMENT

Figure 1:
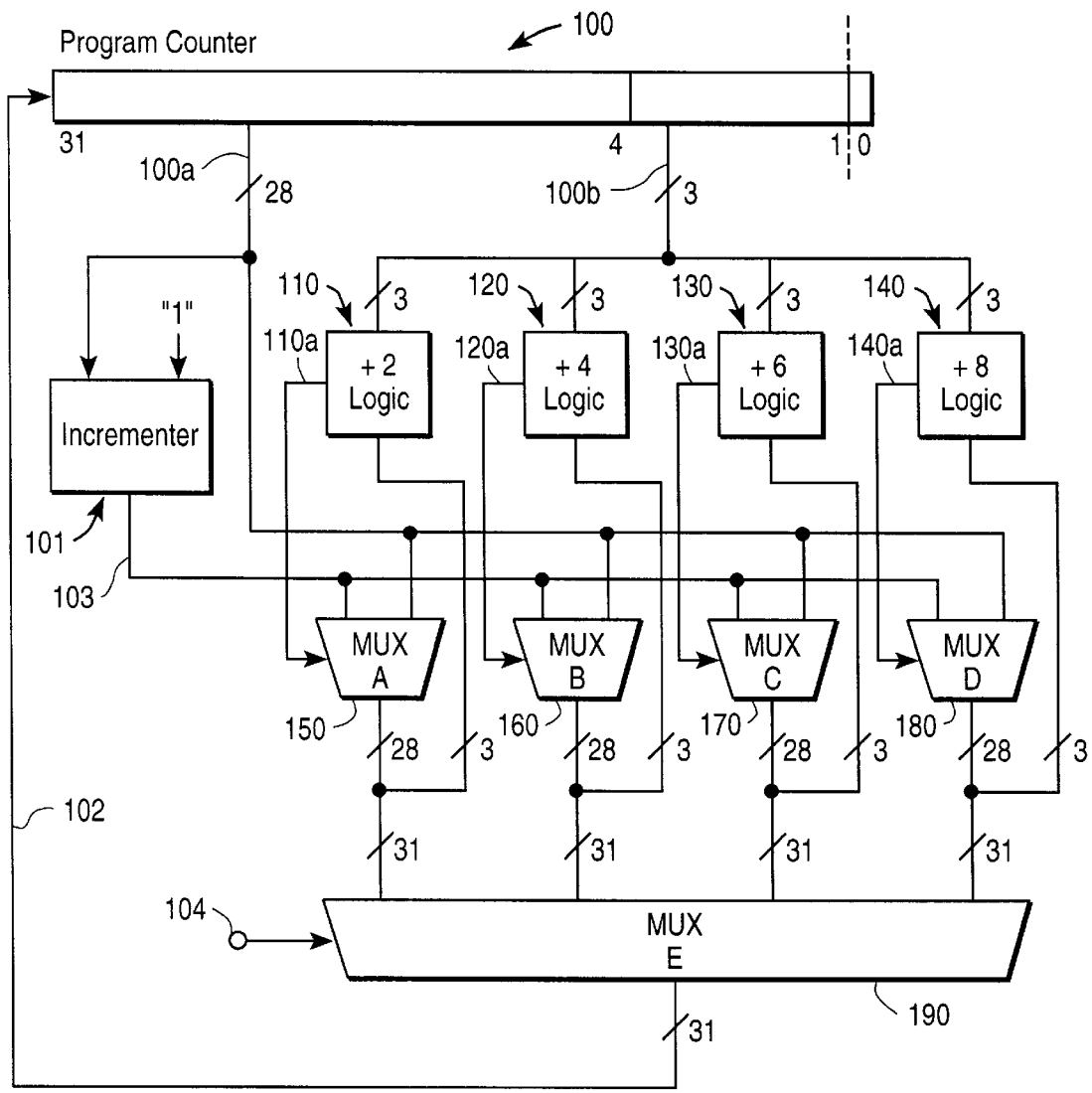
FIG. 1 is a block diagram of an arrangement for updating a program counter.

In FIG. 1, a program counter 100 has, for example, 32 bits. In this embodiment, the minimum increment of the program counter is 2 bytes, as there is no 8-bit instruction and the shortest instruction is assumed to have 16 bit. Thus, bit 0 remains constantly 0 and is therefore not used in this arrangement as indicated by the broken line. On the other hand, the upper 31 bits, namely, bits 1–31, will change during execution of a program. In this embodiment, the microprocessor is capable of executing either 16- or 32-bit instructions. Furthermore, the microprocessor according to this embodiment is capable of issuing up to two instructions in parallel to two pipelines. In other words, it is possible that either one 16-bit instruction, or one 32-bit instruction, or two 16-bit instructions, or one 16-bit instruction and one 32-bit instruction, or two 32-bit instructions are issued to the pipeline within the microprocessor. Therefore, the program counter has to be updated by either 2, 4, 6 or 8.

According to the present invention, the program counter value is split into an upper portion consisting of bits 4–31 and a lower portion consisting of bits 1–3. The upper portion 100a is fed to an incrementer unit 101 which increments the upper portion of the program counter value by 1. The result is fed to the output lines 103. Four multiplexers 150, 160, 170 and 180 are provided. Each multiplexer 150, 160, 170 and 180 has two 28-bit inputs and one 28-bit output. The first input of each multiplexer 150, 160, 170 and 180 is coupled with the output 103 of incrementer 101 and the respective second input is coupled with lines 100a of program counter 100. Four logic circuits are provided whereby each logic circuit calculates a different incremented value of the lower three bits 100b of program counter 100. Each logic circuit 110, 120, 130 and 140 has one input and two outputs. Each input of logic circuits 110, 120, 130 and 140 receives bit 1, bit 2, and bit 3 of program counter 100. Logic circuit 110 increments this value by 2, logic circuit 120 increments this value by 4, logic circuit 130 increments this value by 6, and logic circuit 140 increments this value by 8. Each logic circuit provides a carry signal 110a, 120a, 130a and 140a on its respective first output. The second output of each logic circuit 110, 120, 130 and 140 carries the respective incremented value of the lower three bits 100b of program counter 100. Each carry signal 110a, 120a, 130a and 140a is used to control the multiplexer 150, 160, 170 and 180, respectively. The output of multiplexer 150 is combined with the output of logic circuit 110 to form a 31-bit signal which is fed to a first input of a multiplexer 190. The output of multiplexer 160 is combined with the output logic circuit 120 and fed to a second input of multiplexer 190. In the same manner are the outputs of multiplexer 170 and multiplexer 180 combined with the outputs of logic circuit 130 and logic circuit 140, respectively, and fed to a third and fourth input of multiplexer 190. A control signal 104 is provided to select one of the inputs of multiplexer 190. The selected 31-bit signal is accessible at the output of multiplexer 190 as signal 102 and fed to program counter 100.

Without knowing the increment value, the arrangement, according to the invention, is using the time until the exact increment value is known to calculate all four possible increment values 100. The lower three bits 100b of program counter 100 are fed into four different logic circuits 110, 120, 130 and 140. Each logic circuit calculates different increment values. Depending upon whether a carry in the calculation of the incremented lower three bit value occurs, the respective carry signal 110a, 120a, 130a and 140a controls the respective multiplexer 150, 160, 170 and 180. In case of a carry the respective logic circuit selects the incremented value of the upper portion of 100a of program counter 100 which is provided by incrementer 101 at output 103. Thus, without any additional information, the four possible increment values of program counter 100 can be precalculated. These four 31-bit values are fed to multiplexer 190. Once the exact increment value is known, it is fed into multiplexer 190 as control signal 104. Multiplexer 190 selects the chosen new program counter value and updates program counter 100, here signal 102.

Figure 2:
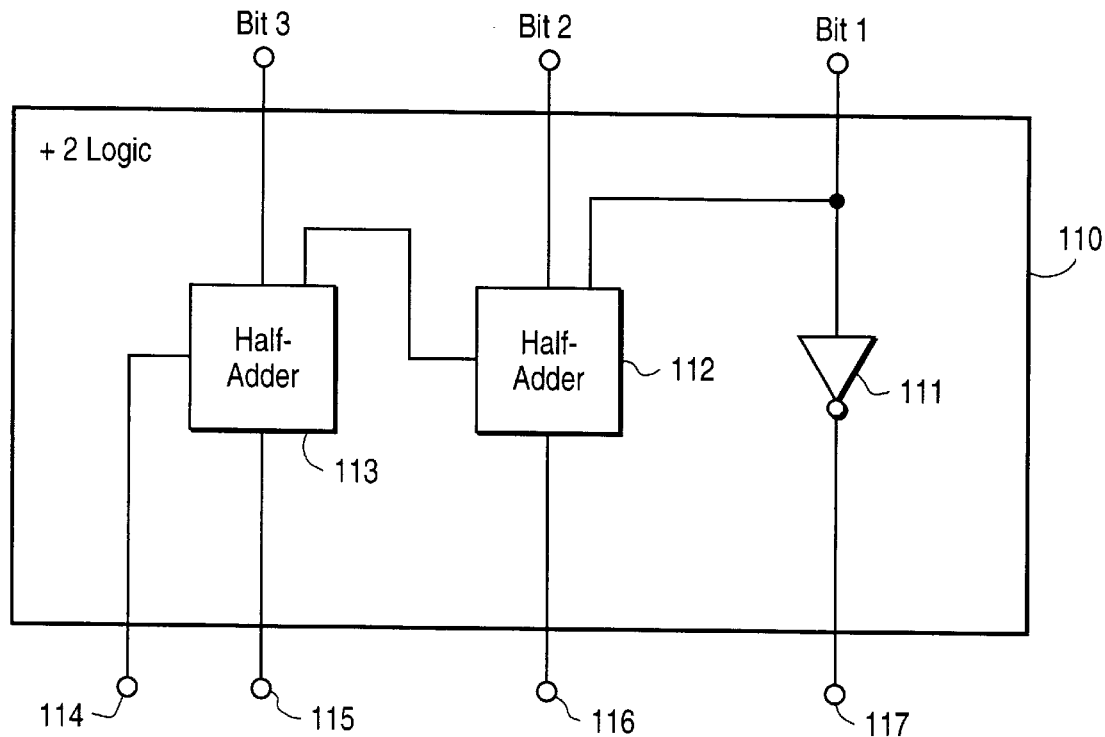
FIGS. 2–5 are embodiments of logic arrangements as shown in FIG. 1.

FIG. 2 shows an embodiment of the logic circuit 110 responsible for incrementing the lower three bits by 2. According to the present invention, this arrangement minimizes the components necessary to increment the value by 2. Bit 1 is coupled with the input of an inverter 111 whose output is coupled with terminal 117. Bit 1 is also coupled with the first input of a half-adder 112. The second input of half-adder 112 is coupled with bit 2. Output of half-adder 112 is coupled with terminal 116. The carry output of half-adder 112 is fed to the first input of a second half-adder 113. The second input of half-adder 113 is coupled with bit 3. The output of half-adder 113 is connected to terminal 115 and the carry output of half-adder 113 is coupled with terminal 114. Terminals 115, 116 and 117 form the lower portion of the program counter value incremented by 2. Terminal 114 carries the control signal for controlling multiplexer 150.

Figure 3:
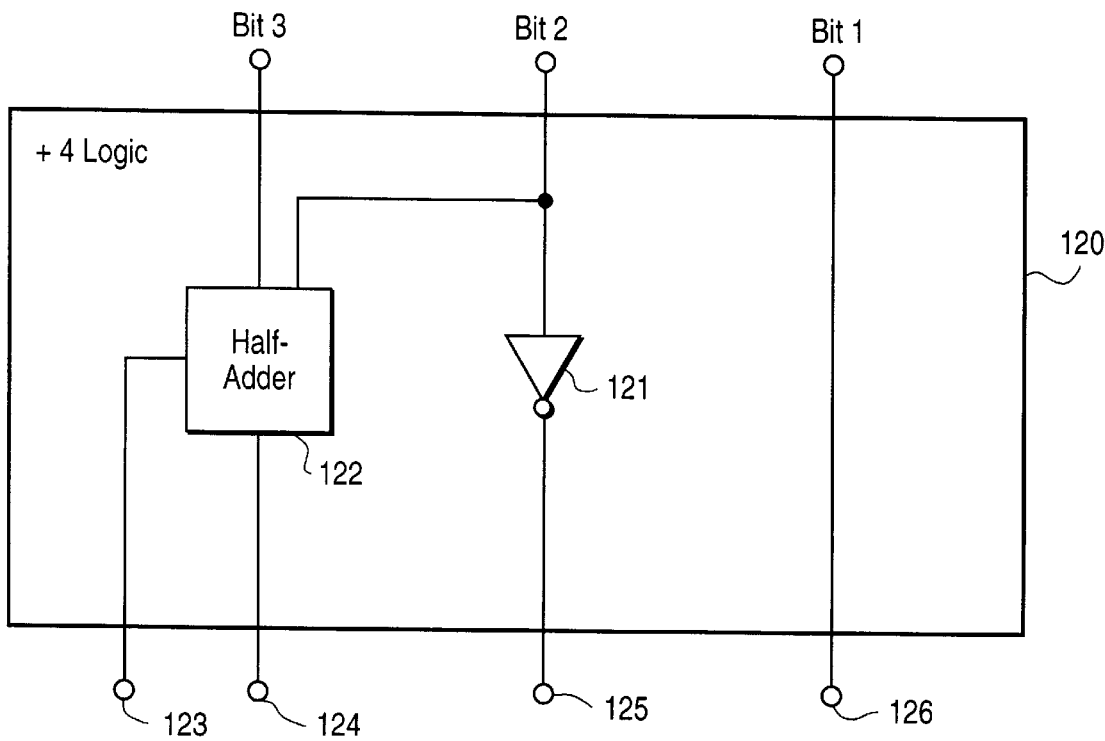

FIG. 3 shows logic circuit 120 for incrementing the lower portion 100b of program counter 100 by 4. According to the present invention, this arrangement minimizes the components necessary to increment the value by 4. Bit 1 is directly connected to terminal 126. Bit 2 is connected to the input of inverter 121 and with the first input of half-adder 122. The output of inverter 121 is coupled with terminal 125. The second input of half-adder 122 is coupled with bit 3 and the output of half-adder 122 is connected with terminal 124. The carry output of half-adder is coupled with terminal 123. Again, terminals 124, 125 and 126 carry the lower portion of program counter value incremented by 4. The signal at terminal 123 is used to control multiplexer 160.

Figure 4:
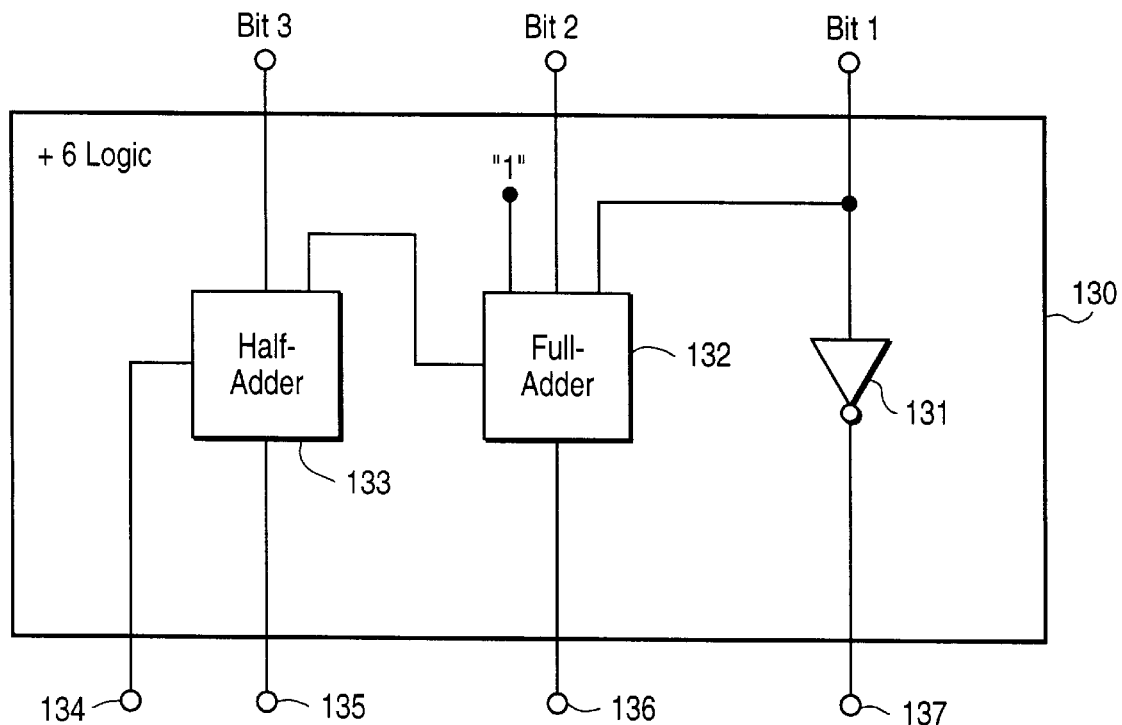

FIG. 4 shows an embodiment for logic circuit 130 responsible for incrementing the lower portion 100b of program counter 100 by 6. According to the present invention, this arrangement minimizes the components necessary to increment the value by 6. Bit 1 is connected to the input of an inverter 131 and to the first input of a full-adder 132. The output of inverter of 131 is coupled with terminal 137 and the output of full-adder 132 is coupled with terminal 136. The second input of full-adder 132 is coupled with bit 2 and the third input of full-adder 132 is connected to a logical 1. The carry output of full-adder 132 is coupled with the first input of a half-adder 133. The second input of half-adder 133 is coupled with bit 3. The output of half-adder 133 is coupled with terminal 135 and the carry output of half-adder 133 is coupled with terminal 134. Again, terminals 135, 136 and 137 carry the lower portion of program counter value incremented by 6. The signal at terminal 134 is used to control multiplexer 170.

Figure 5:
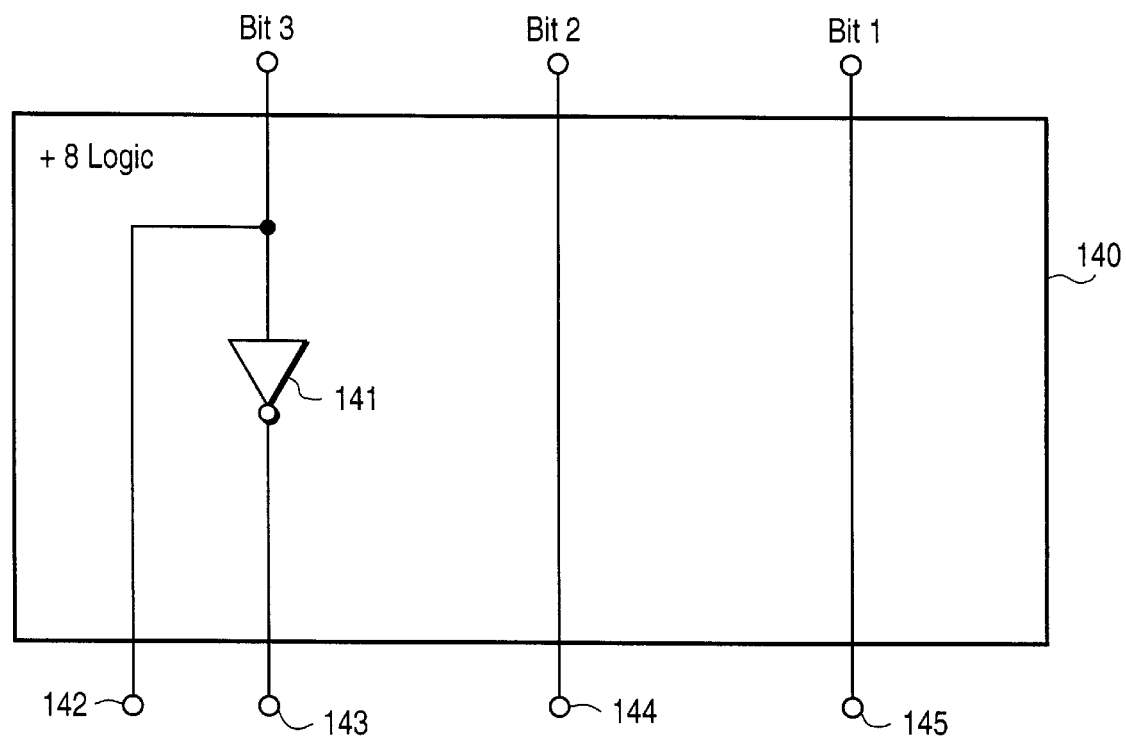

FIG. 5 shows an embodiment of logic circuit 140, responsible for incrementing the lower portion of program counter 100 by 8. According to the present invention, this arrangement minimizes the components necessary to increment the value by 8. Bit 1 is directly connected to terminal 145 and bit 2 is directly connected to terminal 134. Bit 3 is coupled with the input of inverter 141 and with terminal 142. The output of inverter 141 is coupled with terminal 143. Again, terminals 143, 144 and 145 carry the value of the lower portion of program counter 100 incremented by 8. The signal at terminal 142 is used to control multiplexer 180.

The principle of reducing the components for each logic circuit can be adapted easily for any increment number. Essential is to omit elements for bit lines which will not be affected by the process of incrementing. For example, if a bit is only affected by an increment bit, an inverter can be used and the bit itself will be the carry signal. If a bit is affected only by a carry signal from a lower bit, a half-adder can be used. If a bit will be affected by a carry signal and an increment bit, a fuller adder has to be used. If a bit is not affected at all, no logic element is needed. Of course an implementation with one half-adder and two full-adders for each logic circuit is also possible. The number of bits used for the upper portion 100*a* depends on the highest increment value. In the described embodiment, with a 32 Bit address and a minimum increment of 3, the highest increment value is 8. Therefore, three bits (Bits 1, 2, and 3) are needed for the lower portion and 28 bits (Bits 4–31) for the upper portion.

Figure 6:
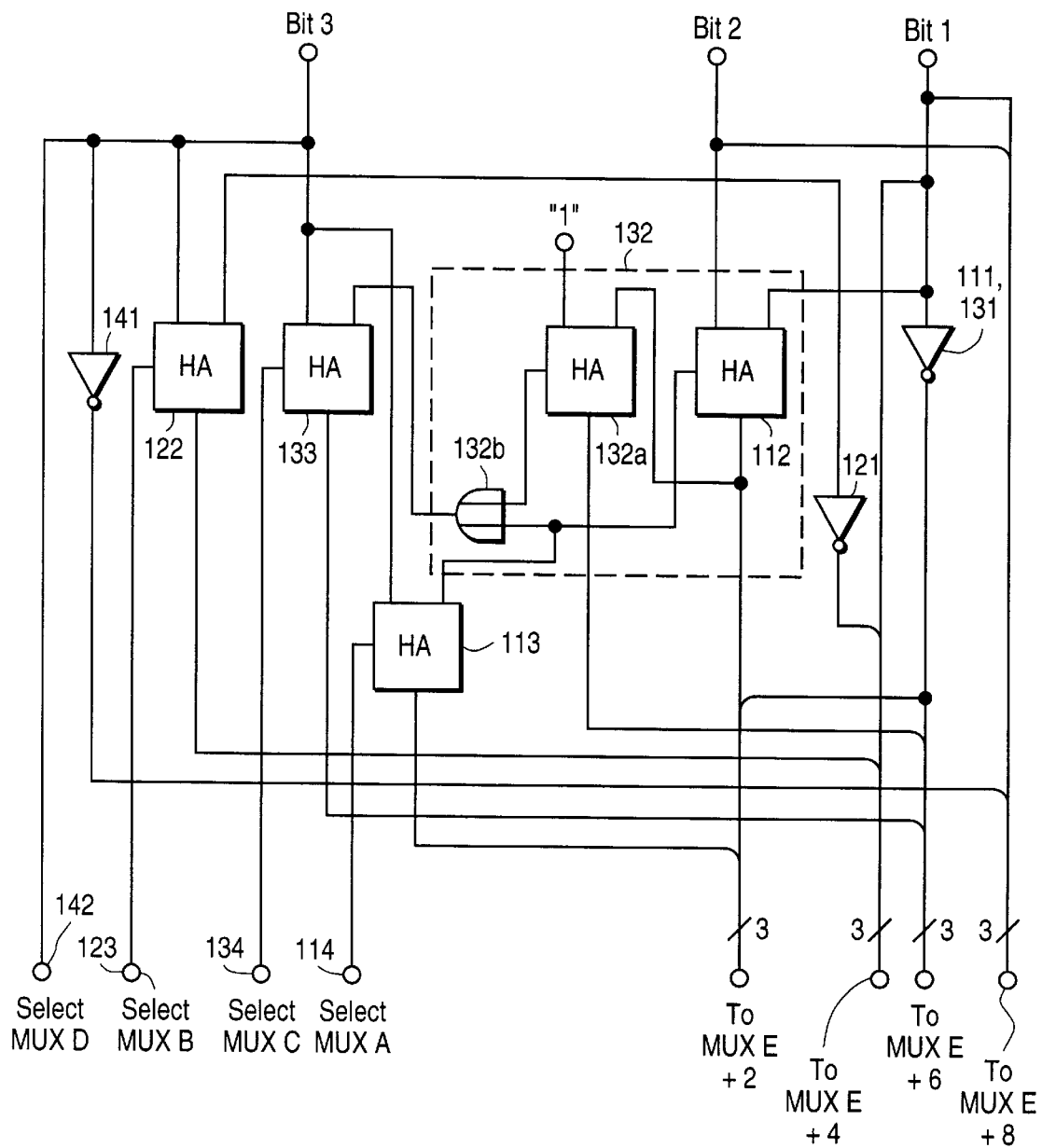
FIG. 6 is another embodiment of the logic circuits of FIG. 1.

To further reduce the number of elements, FIG. 6 shows an embodiment of logic circuits 110, 120, 130 and 140 in which some logic circuits share some logic elements. For example, logic circuit 130 and logic circuit 110 can share the inverter 111 and the half-adder 112. Therefore the output of inverter 111 is fed to the first and third input of multiplexer 190. Half-adder 112 is used within logic circuit 110 as well as logic circuit 130. In logic circuit 130, half-adder 111 is part of full-adder 132 which consists of two half-adders 112, half-adder 132*a* and OR gate 132*b*. The output half-adder 112 is fed to the first input of half-adder 132. The second input of half-adder 132*a* is coupled with a logical 1. The carry outputs of half-adder 112 and of half-adder 132*a* are ORed by OR gate 132*b*. The carry signal of full-adder 132 is provided by the output 132*b* and the output of full-adder 132 is provided by the output of half-adder 132*a*. All other elements are identical to the respective embodiments of FIGS. 2–4.

Figure 7:
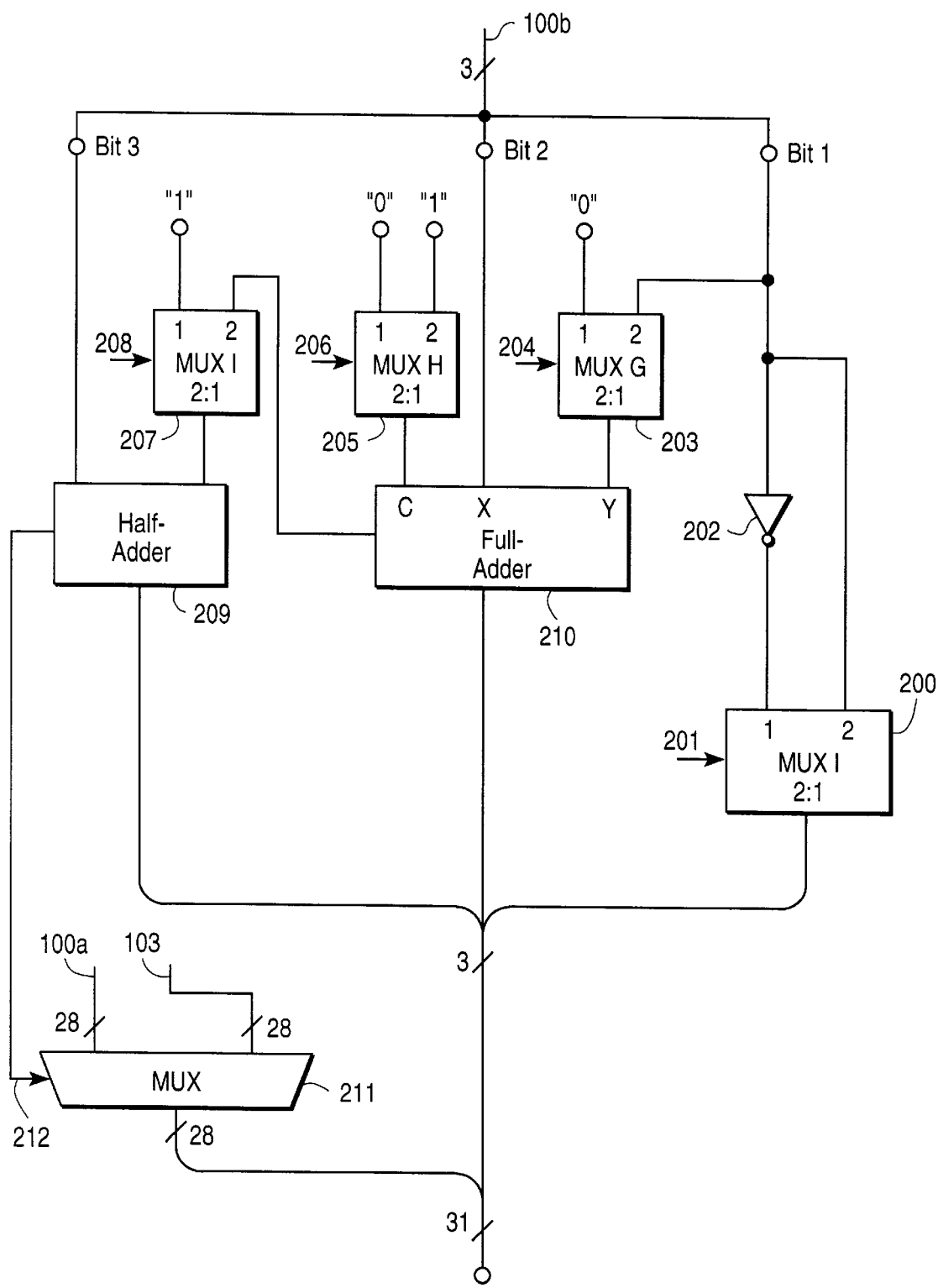
FIG. 7 shows the relevant parts of a second embodiment according to the present invention.

If timing is not as critical for providing an incremented program counter value, further logic elements can be reduced which saves even more silicon area. FIG. 7 shows an embodiment of such a structure. Bit 1 from the lower portion 100*b* from program counter 100 is connected with the input of an inverter 202 and the first input of a multiplexer 200. The output of inverter 202 is coupled with the second input of multiplexer 200 (Mux F). Multiplexer 200 is controlled by control signal 201. The output of multiplexer 200 controls bit 1 of the incremented program counter value. Bit 1 is also coupled with a first input of multiplexer 203 (Mux G). The second input of multiplexer 203 is coupled with a logical 0. The output of multiplexer 203 is coupled with the first input of a full-adder 210. The second input of full-adder 210 is coupled with bit 2 of the lower portion 100*b* of program counter 100. Multiplexer 203 is controlled by control signal 204. A further multiplexer 205 (Mux H) is provided which selects between a logical 0 and a logical 1. Signal 206 controls multiplexer 205. The output of multiplexer 205 is coupled with the third input of full-adder 210. The output of full-adder 210 carries bit 2 of the incremented program counter value. The carry output of full-adder 210 is coupled with the first input of a further multiplexer 207 (Mux I). The second input of multiplexer 207 is coupled with a logical 1. Multiplexer 207 is controlled by control signal 208. The output of multiplexer 207 is coupled with the first input of half-adder 209. The second input of half-adder is coupled with bit 3 of the lower portion 100*b* of program counter 100. The output of half-adder 209 forms bit 3 of the incremented program counter value. A multiplexer 211 with two 28-bit inputs and one 28-bit output is provided. The first 28-bit input is coupled with the upper portion 100*a* of program counter 100, and the second input of multiplexer 211 is coupled with the incremented upper portion 103 which is provided at the output of incrementer 101. The output of multiplexer 211 provides bit 4 to bit 31 of the incremented program counter value. Multiplexer 211 is controlled by control signal 212 which is the carry output of half-adder 209.

As can be seen from FIG. 7 only four 2×1 multiplexers, 1 inverter, 1 full-adder, 1 half-adder and 1 multiplexer selecting 28 bits is necessary to update program counter 100. The multiplexers 200, 203, 205 and 207 are controlled according to the table shown in FIG. 8.

In case of an increment value 2, multiplexer 200 is switched to input 1, multiplexer 203 is switched to input 2, multiplexer 205 is switched to input 1 and multiplexer 207 is switched to input 2. Switching multiplexer 205 to input 1 turns full-adder 210 into a half-adder as the carry input is set to 0. Thus, the arrangement functions as logic circuit 110 shown in FIG. 2.

In case of an increment value 4, multiplexer 200 is switched to input 2, multiplexer 203 is switched to input 1 and multiplexers 205 and 207 are switched to input 2. By selecting a logical 0 as input 1 for full-adder 210 and a logical 1 for the carry input of full-adder 210, full-adder 210 acts like an inverter for the input signal bit 2, whereby the carry output is identical to the second input value. Thus, the arrangement is identical to logical circuit 120 as shown in FIG. 3.

If the increment value for program counter 100 has to be set to 6, multiplexer 200 is switched to input 1, multiplexers 203, 205 and 207 are set to input 2. As can be seen, the arrangement now functions identically to the logic circuit 130 shown in FIG. 4.

In case of an increment value of 8, multiplexer 200 is set to input 2 and multiplexers 203, 205 and 207 are set to input 1. By switching the first input of full-adder 210 and the carry input of full-adder 210 to 0, the output of full-adder 210 is always identical to its second input, namely bit 2. By switching the first input of half-adder 209 to a logical 1, half-adder 209 acts as an inverter whereby the carry output of half-adder 209 is identical to its second input, namely bit 3. Thus, the arrangement functions as logic circuit 140 shown in FIG. 5.

All arrangements shown can be easily extended or reduced to provide more or less increment values. For example, multiplexer 207 can be omitted thereby providing only three different increment values, namely 2, 4 and 6. If a microprocessor can only issue instructions which have a combined maximum length of 6 bytes, this arrangement can provide every increment value necessary. On the other hand, all arrangements can be easily extended to provide more increment values. For example, according to the embodiment shown in FIG. 1, additional logic circuits can be provided and the lower portion 100b can be easily extended to additional bits. Also, in case of 8-bit instructions, bit 0 of program counter 100 has to be incremented. This can be easily done by replacing bit 1 by bit 0, bit 2 by bit 1, etc. In this case, the arrangement according to FIG. 1 would provide incremented values of 1, 2, 3 and 4. On the other hand, in case the shortest instruction is 32 bit long bit 1 can be omitted as sescribed above with bit 0. Thus, the arrangement would provide incremented values of 4, 8, 12 and 16.

Figures 9, 10:
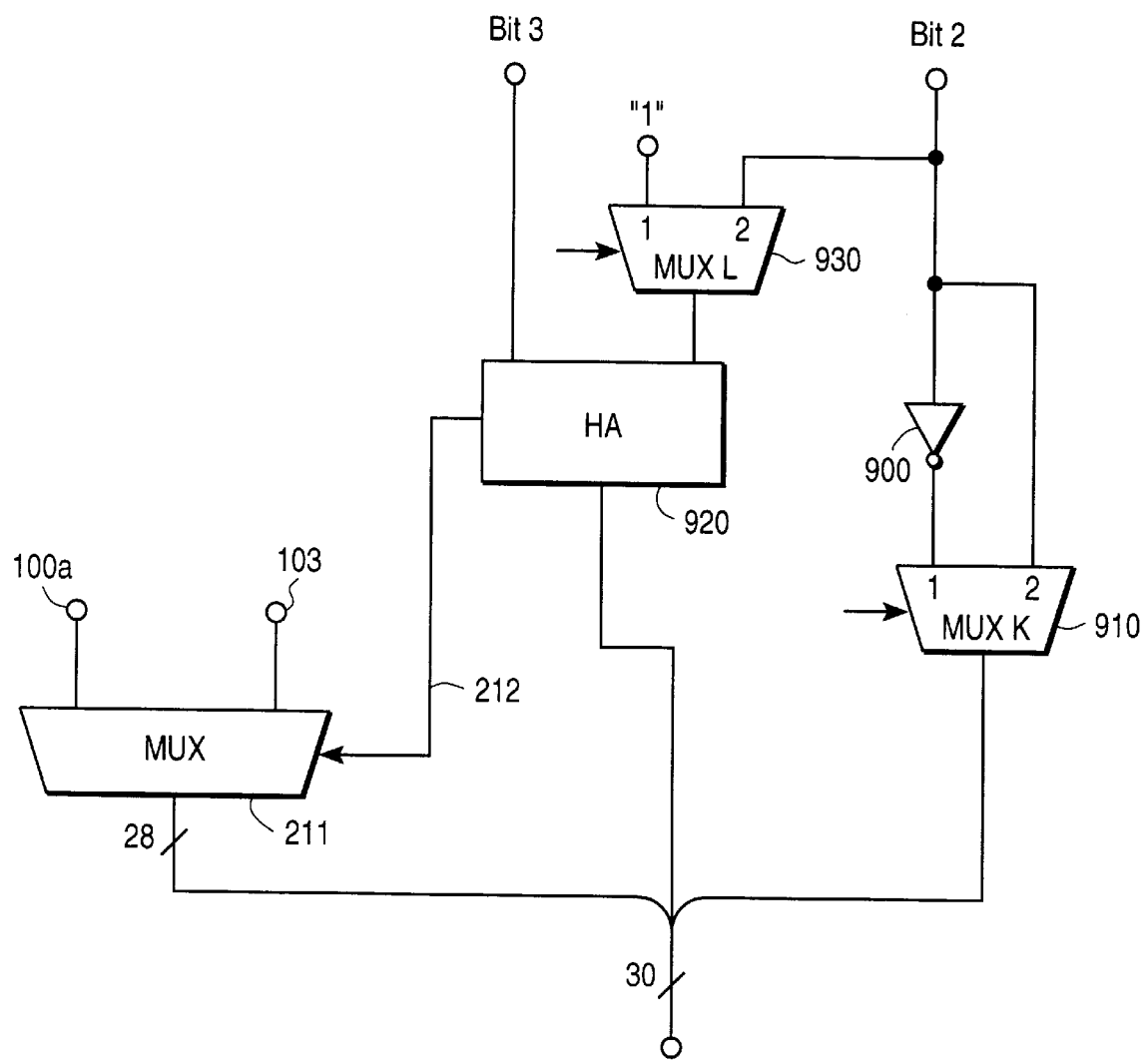
FIG. 9 shows the relevant parts of a third embodiment according to the present invention.
FIG. 10 is a table of the different signals provided to the multiplexers of FIG. 9.

FIG. 9 shows an arragement for providing an incremented address for a central processing unit which can issue one or two 32 bit instructions or for a central processing unit which can execute 32 bit or 64 bit instructions. In both cases the increment value can be either 4 or 8. For such a microprocessor only one inverter, one half-adder and three multiplexers are necessary. As the shortes increment value is 4 bit 0 and bit 1 of the program counter are not used and remain "0" all the time. Bit 2 is coupled with the input of inverter 900, the second input of multiplexer 910 (Mux K), and the second input of multiplexer 930 (Mux L). The output of inverter 900 is coupled with the first input of multiplexer 910 whose output forms bit 2 of the incremented program counter value. The first input of multiplexer 930 is coupled with the first input of half-adder 920 whose second input is coupled with bit 3 of the program counter. The output of half-adder 920 forms bit 3 of the incremented program counter value and the carry output of half-adder 920 is used to select one of the inputs of multiplexer 211 in the same manner as described with FIG. 7.

If instead of bit 2 and bit 3 of the program counter bit 1 and bit 2 are used then increment values of 2 and 4 would be provided. As can be seen, modification of the arrangements according to FIG. 7 and 9 can provide any increment value as necessary.

All embodiments are able to update a program counter by reducing the necessary logical elements of such an arrangement and therefore reducing the silicon area needed for such an arrangement. The embodiment according to FIG. 1 is preferred in high speed microcontrollers where the time between evaluation of the program counter increment and the time when the new program counter value is needed, is very little. As the critical time for calculating the updated program counter value according to the embodiments of FIG. 7 and FIG. 9 are only determined by a few elements thess embodiments are preferred in cases where more time is available because it significantly reduces the amount of logical elements and therefore the amount of additional silicon area.

What is claimed:

1. A method for providing a program counter value within a central processing unit, whereby said program counter value comprises n bits and has to be increased by one of a plurality of different fixed increment values, comprising the steps of:

providing an upper partial content of the current program counter value and its value incremented by 1;

providing a plurality of lower partial contents of the current program counter value incremented by one of said plurality of fixed increment values, respectively, whereby a carry bit is provided;

selecting for each of said plurality of incremented lower partial contents depending on said respective carry bit selecting either said upper partial content of the current program counter value or said incremented upper partial content of the current program counter value;

combining said selected upper and lower contents to form a plurality of new program counter values;

selecting upon receiving of a final increment value one of said new program counter values.

2. Method according to claim 1, wherein the lower partial content starts with the second least significant bit of said program counter value.

3. A method for providing a program counter value within a central processing unit, whereby said program counter value comprises n bits and has to be increased by one of a plurality of different fixed increment values, comprising the steps of:

providing an upper partial content of the current program counter value and its value incremented by 1;

providing a lower partial content of the current program counter value incremented by a selected one of said plurality of fixed increment values, whereby a carry bit is provided;

depending on said respective carry bit selecting either said upper partial content of the current program counter value or said incremented upper partial content of the current program counter value;

combining said selected upper and lower contents to form a new program counter value.

4. Method according to claim 3, wherein the lower partial content starts with a bit that is higher than the least significant bit of said program counter value.

5. Data processing device having a program counter, whereby said program counter comprises n bits and has to be increased by one of a plurality of different fixed increment values; comprising:

an incrementer for incrementing an upper partial content of said program counter value by 1, coupled with the upper partial of said program counter;

a plurality of logic circuits, whereby each logic circuits is coupled with one or more bits of a lower partial content of said program counter to provide the value of said lower partial content incremented by one of said fixed increment values and a control signal;

a plurality of multiplexers coupled with said upper partial content of said program counter and with said incremented upper partial content, respectively, whereby said multiplexers are controlled by said control signal, and each output of said multiplexers is combined with the output of said logic circuits, respectively to form a respective incremented program counter value;

a multiplexer coupled with said combined outputs to select one of said incremented program counter values.

6. Data processing unit according to claim 5, whereby a logic circuit comprises a single inverter coupled with the most significant bit of the selected lower partial content of said program counter and said control signal is formed by the most significant bit of the selected lower partial content of said program counter.

7. Data processing unit according to claim 5, whereby a logic circuit comprises a half-adder having two inputs, one output and a carry output, and an inverter, whereby the inputs of said half-adder are coupled with the two most significant bits of the selected lower partial content of said program counter and the input of said inverter is coupled with the second significant bit of the selected lower partial content of said program counter, and the carry output forms said control signal.

8. Data processing unit according to claim 5, whereby a logic circuit comprises two half-adder having two inputs, one output and a carry output, and an inverter, whereby the inputs of said first half-adder are coupled with the most significant bit of the selected lower partial content of said program counter and the carry bit of said second half-adder, the inputs of said second half-adder are coupled with the second and third significant bit of the selected lower partial content of said program counter and the input of said inverter is coupled with the third significant bit of the selected lower partial content of said program counter, and the carry output of said first half-adder forms said control signal.

9. Data processing unit according to claim 5, whereby a logic circuit comprises a half-adder having two inputs, one output and a carry output, a full-adder having three inputs, one output and a carry output, and an inverter, whereby the inputs of said half-adder are coupled with the most significant bit of the selected lower partial content of said program counter and the carry bit of said full-adder, the inputs of said full-adder are coupled with the second significant bit, the third significant bit of the selected lower partial content of said program counter and a logical 1, and the input of said inverter is coupled with the third significant bit of the selected lower partial content of said program counter, the carry output of said half-adder forms said control signal.

10. Data processing unit according to claim 5, whereby a logic circuit comprises for a bit of said lower partial content which is affected only by an increment bit of one of said increment value an inverter whose input is coupled with said bit and said bit forms a carry bit.

11. Data processing unit according to claim 5, whereby a logic circuit comprises for a bit of said lower partial content which is affected only by a carry bit a half-adder whose first input is coupled with said bit, and whose second input is coupled with said carry bit.

12. Data processing unit according to claim 5, whereby a logic circuit comprises for a bit of said lower partial content which is affected by a carry bit and an increment bit of one of said increment values a full-adder whose first input is coupled with said bit, whose second input is coupled with said carry bit, whose third input is coupled with said increment bit.

13. Data processing unit according to claim 5, whereby two of said logic circuits share at least one of their logic elements.

14. Data processing unit according to claim 5, wherein the lower partial content starts with a bit that is higher than the least significant bit of said program counter value.

15. Data processing device having a program counter for storing an upper partial content and a lower partial content, whereby said program counter comprises n bits and has to be increased by at least two different fixed increment values: comprising:

an incrementer coupled with the upper partial content of said program counter for incrementing said upper partial content of said program counter value by 1;

a single inverter coupled with a first bit of the selected lower partial content of said program counter, a first multiplexer with inputs coupled with first bit and with the output of said inverter, respectively, the output of said first multiplexer providing a first bit of said incremented program counter value;

a half-adder with two inputs and two outputs, said first inputs being coupled with a second bit of the selected lower partial content, said second input being coupled with an output of a second multiplexer selecting either a logical "1" or said first bit as an input, said first output of said half-adder providing a second bit of said incremented program counter value;

a multiplexer being controlled by said second output of said half-adder and whose inputs are coupled with said upper content of said program counter and with the output of said incrementer, the output of said incrementer providing the upper content of said incremented program counter value.

16. Data processing unit according to claim 15, wherein the lower partial content starts with a bit that is higher than the least significant bit of said program counter value.

17. Data processing device having a program counter for storing an upper partial content and a lower partial content, whereby said program counter comprises n bits and has to be increased by at least two different fixed increment values: comprising:

an incrementer coupled with the upper partial content of said program counter for incrementing said upper partial content of said program counter value by 1;

a single inverter coupled with a first bit of the selected lower partial content of said program counter, a first multiplexer with inputs coupled with first bit and with the output of said inverter, respectively, the output of said first multiplexer providing a first bit of said incremented program counter value;

a full-adder with three inputs and two outputs, said first input being coupled with the output of a second multiplexer whose inputs are coupled with said first bit of the selected lower partial content and with a logical "0", respectively, said second input being coupled with a second bit of the selected lower partial content, said third input being coupled through a third multiplexer with either a logical "0" or a logical "1", said first output of said full-adder providing a second bit of said incremented program counter value;

a half-adder with two inputs and two outputs, said first inputs being coupled with a second output of said full-adder and said second input being coupled with a third bit of the selected lowerpartial content, said first output of said half-adder providing a third bit of said incremented program counter value; and said control signal is formed by the most significant bit of the selected lower partial content of said incremented program counter value;

a multiplexer being controlled by said second output of said half-adder and whose inputs are coupled with said upper content of said program counter and with the output of said incrementer, the output of said incrementer providing the upper content of said incremented program counter value.

18. Data processing unit according to claim 17, whereby a fourth multiplexer with two inputs and one output is provided, said first input is coupled with said second output of said full-adder, said second input is coupled with a logical "1", and said output is coupled with said first input of said half-adder.

19. Data processing unit according to claim 17, wherein the lower partial content starts with a bit that is higher than the least significant bit of said program counter value.

* * * * *